United States Patent [19]
Sinelnikov

[11] Patent Number: 5,946,941
[45] Date of Patent: Sep. 7, 1999

[54] METHOD FOR PROCESSING PYROLYSIS GAS PRIOR TO GAS SEPARATION AND METHOD FOR PRODUCING LOW TEMPERATURE COLD IN A VAPOR COMPRESSION REFRIGERATING MACHINE DURING PROCESSING OF PYROLYSIS GAS PRIOR TO GAS SEPARATION

[76] Inventor: David Pavlovich Sinelnikov, Molodogvardeiskaya ulitsa, 47, korpus 1, kv.25, Moscow, Russian Federation

[21] Appl. No.: 08/913,624

[22] PCT Filed: Mar. 31, 1995

[86] PCT No.: PCT/RU95/00059

§ 371 Date: Sep. 19, 1997

§ 102(e) Date: Sep. 19, 1997

[87] PCT Pub. No.: WO96/30708

PCT Pub. Date: Oct. 5, 1996

[30] Foreign Application Priority Data

Oct. 7, 1993 [RU] Russian Federation ............. 93047170

[51] Int. Cl.$^6$ ....................................... F25J 3/00
[52] U.S. Cl. .................................. 62/613; 62/632; 62/633
[58] Field of Search ................................ 62/613, 632, 633

[56] References Cited

U.S. PATENT DOCUMENTS

| | | |
|---|---|---|
| 3,970,441 | 7/1976 | Etzbach et al. . |
| 3,996,030 | 12/1976 | Scheibel . |
| 4,163,652 | 8/1979 | Gazzi et al. . |
| 4,878,931 | 11/1989 | Grant ........................................ 62/632 |
| 5,685,171 | 11/1997 | Foester ................................. 62/632 X |

FOREIGN PATENT DOCUMENTS 2 242 998 3/1974 Germany .

OTHER PUBLICATIONS

Pyrolysis of Hydrocarbon Raw Material, Moscow Khimia 1987, with English translation.
Refrigerating Machines, I.A. Sakun, Leningrad, Mashinostroenie, 1985 with English translation.

*Primary Examiner*—Christopher B. Kilner
*Attorney, Agent, or Firm*—Nath & Associates; Gary M. Nath; Harold L. Novick

[57] ABSTRACT

A method for processing pyrolysis gas prior to gas separation provides high economical efficiency due to low energy consumption for compression and low consumption of cooling water. This is due to the relatively low temperature of the pyrolysis gas and the low pressure losses during multistage compression, which in turn is determined by the organization of the processes of cooling by contact heat exchange between the pyrolysis gas and the washing water and operating liquid, by cooling them with an external medium in refrigerating machines and with a cold carrier in evaporators of absorption machines, and also by preliminarily cooling the washing water in the generators of those machines. A method for producing low temperature cold in a vapour compression refrigerating machine is characterized by a high coefficient of performance of the refrigerating machine and a low consumption of cooling water, which is achieved by means of removing the condensation heat of the coolant to atmospheric air and by overcooling the liquid coolant prior to the throttling processes with the aid of an absorption refrigerating machine which uses for its functioning the heat removed from the pyrolysis gas by washing water in a column.

12 Claims, 4 Drawing Sheets

METHOD FOR PROCESSING PYROLYSIS GAS PRIOR TO GAS SEPARATION AND METHOD FOR PRODUCING LOW TEMPERATURE COLD IN A VAPOR COMPRESSION REFRIGERATING MACHINE DURING PROCESSING OF PYROLYSIS GAS PRIOR TO GAS SEPARATION

FIELD OF THE INVENTION

This invention relates to the oil-refining and gas-processing industry and the refrigeration engineering field, especially to methods for processing hydrocarbon gases prior to gas separation and methods for producing low temperature cold for use in the processing of oil gases and pyrolysis gas.

DESCRIPTION OF PRIOR ART

A method for processing pyrolysis gas prior to gas separation is known, the method comprising cooling initial hot pyrolysis gas with partial condensation of heavy hydrocarbons and water vapours by means of washing with water, cooling waste hot water after washing the pyrolysis gas and using it again, compressing the washed pyrolysis gas in a multistage compressor with intermediate cooling between stages and final cooling, and low temperature cooling of pyrolysis gases in a vapour compression refrigerating machine (T. N. Mukhina et al., Pyrolysis of Hydrocarbon Materials, Moscow, Khimiya, 1987, pp. 143–154, [1]).

However, the existing method for processing pyrolysis gas [1] is characterized by a high consumption of energy (i.e., low efficiency) due to the high temperature of the pyrolysis gases prior to compression in the first and subsequent stages of the compressor, high hydraulic resistance (pressure loss), high heat load on the refrigerating machine, and large consumption of cooling water.

A method for producing low temperature cold in a vapour compression refrigerating machine is known, the method comprising compressing a coolant, condensing it, overcooling, and partially throttling liquid coolant with removal of vapours formed thereby for compression, throttling another part of the liquid coolant and evaporating it (Refrigerating Machines, Edited by I. A. Sakun, Leningrad, Mashinostroenie, 1985, pp. 69–74 [2]).

Due to the high energy consumption for compressing the coolant and the high consumption of water for cooling and condensing it, the known method for producing cold [2] does not make it possible to attain a high refrigerating performance coefficient and efficiency.

DISCLOSURE OF THE INVENTION

The object of the present invention is to develop a method for processing pyrolysis gas prior to gas separation and a method for producing low temperature cold in a vapour compression refrigerating machine during the processing of pyrolysis gas prior to gas separation that provide high efficiency by reducing energy consumption and cooling water consumption.

This is achieved in that a method is proposed for processing pyrolysis gas prior to gas separation, comprising cooling hot pyrolysis gas with partial condensation of heavy hydrocarbons and water vapours by means of multistage washing of pyrolysis gas with water in a column, removing the condensate of said heavy hydrocarbons and vapours with waste washing water, regenerating the waste water by separating said condensate therefrom and subsequently cooling it with an external medium, recycling the regenerated washing water into the water washing column, compressing the washed pyrolysis gas in a multistage compressor with intermediate and final cooling of pyrolysis gas with the removal of the condensate of heavy hydrocarbons and water vapours therefrom, and cooling pyrolysis gas at a low temperature by means of a vapour compression refrigerating machine, in which, according to the invention, the cooling between stages and final cooling of pyrolysis gas are accomplished by means of contact heat exchange thereof with operating liquid in scrubbers with the removal of the condensate of heavy hydrocarbons and water vapours by the operating liquid, with recycling of the latter into scrubbers after its regeneration, which is accomplished by removing said condensate from the operating liquid and subsequently cooling this liquid, including the removal of heat therefrom by an external medium in a cooler, wherein the cooling of regenerated washing water and/or operating liquid is accomplished by the coolant of absorption refrigerating machines in evaporators of these machines, preliminary cooling of regenerated washing water is accomplished in the generators of these machines by means of evaporating the operating solution with it.

In order to reduce energy consumption for compressing and to increase the productivity (economical efficiency) during the processing of gases of pyrolysis of heavy hydrocarbon fractions, it is advisable that pyrolysis gas at the last stage of the water washing step in the column be cooled with cooled washing water, which is recycling in an additional loop with regeneration of the water, and that the condensate of heavy hydrocarbons, obtained from pyrolysis gas during the cooling thereof in the last stage of water washing, be fed by means of a pump into the pyrolysis gas which is directed for cooling between the stages of the compressor.

Furthermore, in order to increase the operative reliability, it is recommended that the temperature of the pyrolysis gas during cooling be reduced to the minimum values, limited by the temperature at which hydrates are formed.

Atmospheric air, preliminarily cooled during the hot season of the year by the evaporation of water dispersed therein, may be used as the external medium.

Water may also be used as the external medium and operating liquid.

The invention also includes a method for producing low temperature cold in a vapour compression refrigerating machine during the processing of pyrolysis gas prior to gas separation, comprising compressing a coolant in a compressor, condensing, overcooling, partially throttling into an intermediate vessel with the removal of the formed vapours of coolant into the compressor, final throttling, evaporating the coolant with the production of low temperature cold, and feeding formed vapours into the compressor, in which, according to the invention, overcooling the coolant is accomplished by means of an absorption refrigerating machine, which is actuated by heat removed from pyrolysis gas in a water washing column.

In order to reduce the consumption of cooling water, it is recommended that the heat that is formed during condensation of the coolant be removed to atmospheric air, preliminarily cooled in the hot season of the year by evaporation of water dispersed therein.

The advantages of the present invention are based on the fact that as compared with the known method for processing pyrolysis gas [1], the proposed method is more efficient because of the lower energy consumption for compression and the lower consumption of cooling water. This is due to the relatively low temperature of the pyrolysis gas and the low pressure losses when the pyrolysis gas is cooled between compression stages, which, in turn, is determined by the organization of the cooling processes by means of contact heat exchange between the pyrolysis gas and the washing water and operating liquid, their cooling by the external medium in the refrigerating machines and by the coolant in the evaporators of the absorption refrigerating machines, as well as by the preliminary cooling of washing water in the generators of these machines.

In the proposed method for producing low temperature cold in a vapour compression refrigerating machine, the removal of the condensation heat of the coolant to atmospheric air and the overcooling of the coolant prior to the throttling processes with the aid of an absorption refrigerating machine using the heat removed from pyrolysis gas by washing water for the functioning thereof, makes it possible to enhance the economical efficiency (to increase the specific refrigerating capacity, to increase the value of the refrigerating coefficient, to decrease the consumption of cooling water).

BEST METHOD OF CARRYING OUT IN THE INVENTION

Figure 1:
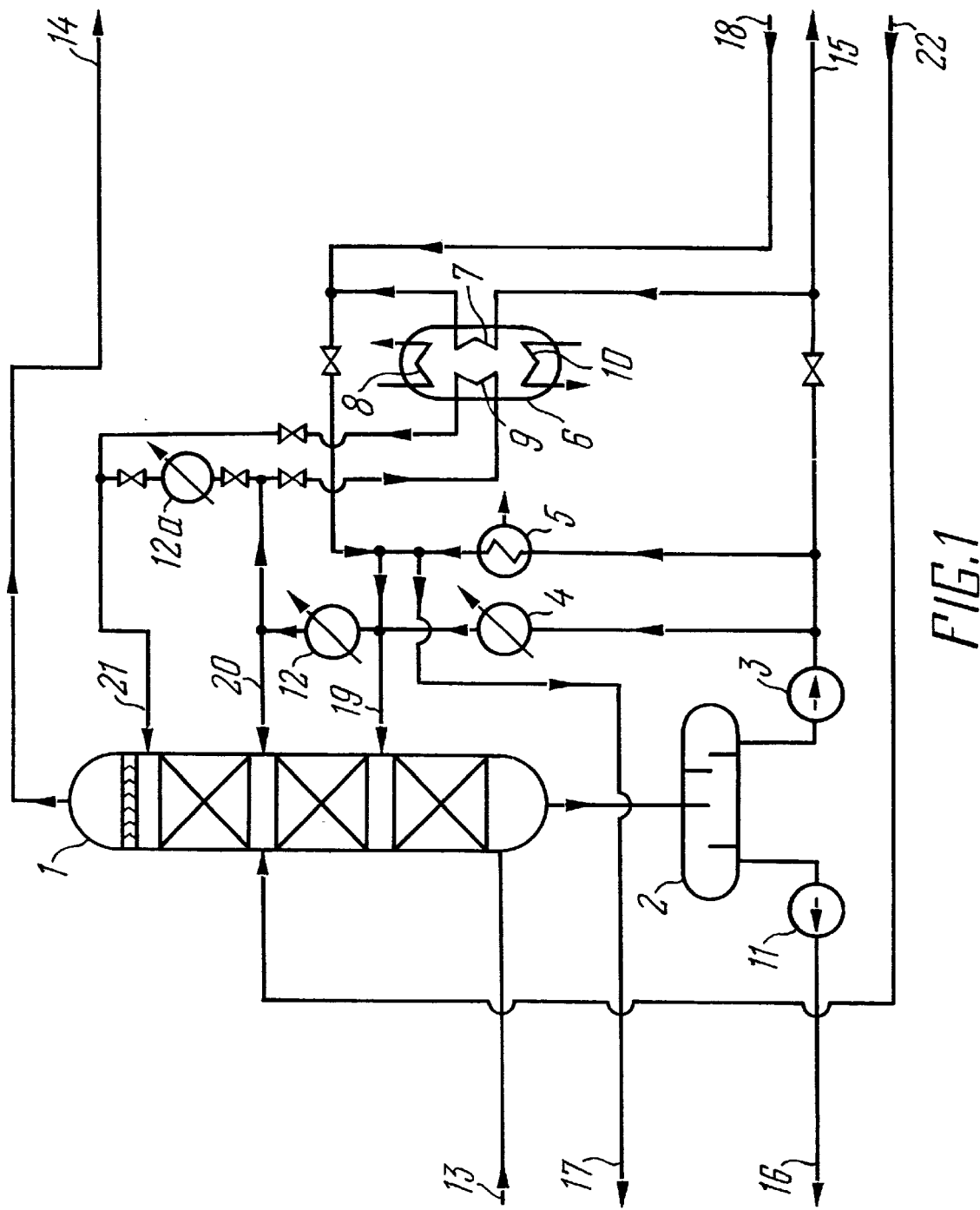
FIG. 1 is a schematic diagram of the unit for cooling pyrolysis gas by means of multistage water washing in a column prior to compression.

The diagram of the unit for cooling pyrolysis gas (FIG. 1) comprises a column 1 for three-stage water washing, a settler 2 for washing water, a pump 3 for regenerated washing water, an aerial cooler 4 of washing water, a heater 5 of the flows, an absorption lithium bromide refrigerating machine 6 with a generator 7, a condenser 8, an evaporator 9 and an absorber 10, a pump 11 for the condensate of pyrolysis gas, aerial (spray) washing water coolers 12 and 12a, an input gas line 13, a line 14 for washed pyrolysis gas, a line 15 for regenerated washing water, a line 16 for feeding the pyrolysis condensate from the settler 2 to the pump 11, a line 17 for chemically polluted water, a line 18 for cooled washing water after generators of the absorption lithium bromide refrigerating machine, lines 19, 20, 21 for recycling water to respectively first, second and third water washing stages, a line 22 for removing the hydrocarbon condensate from the pyrolysis gas multistage compression unit.

The diagram of the unit for cooling gases of pyrolysis of heavy hydrocarbon fractions (FIG. 2) also comprises an additional loop 23 with a settler 24 for washing water, a pump 25, a line 26 for regenerated washing water 26, and a line 27 for the hydrocarbon condensate with a pump 28.

Figure 3:
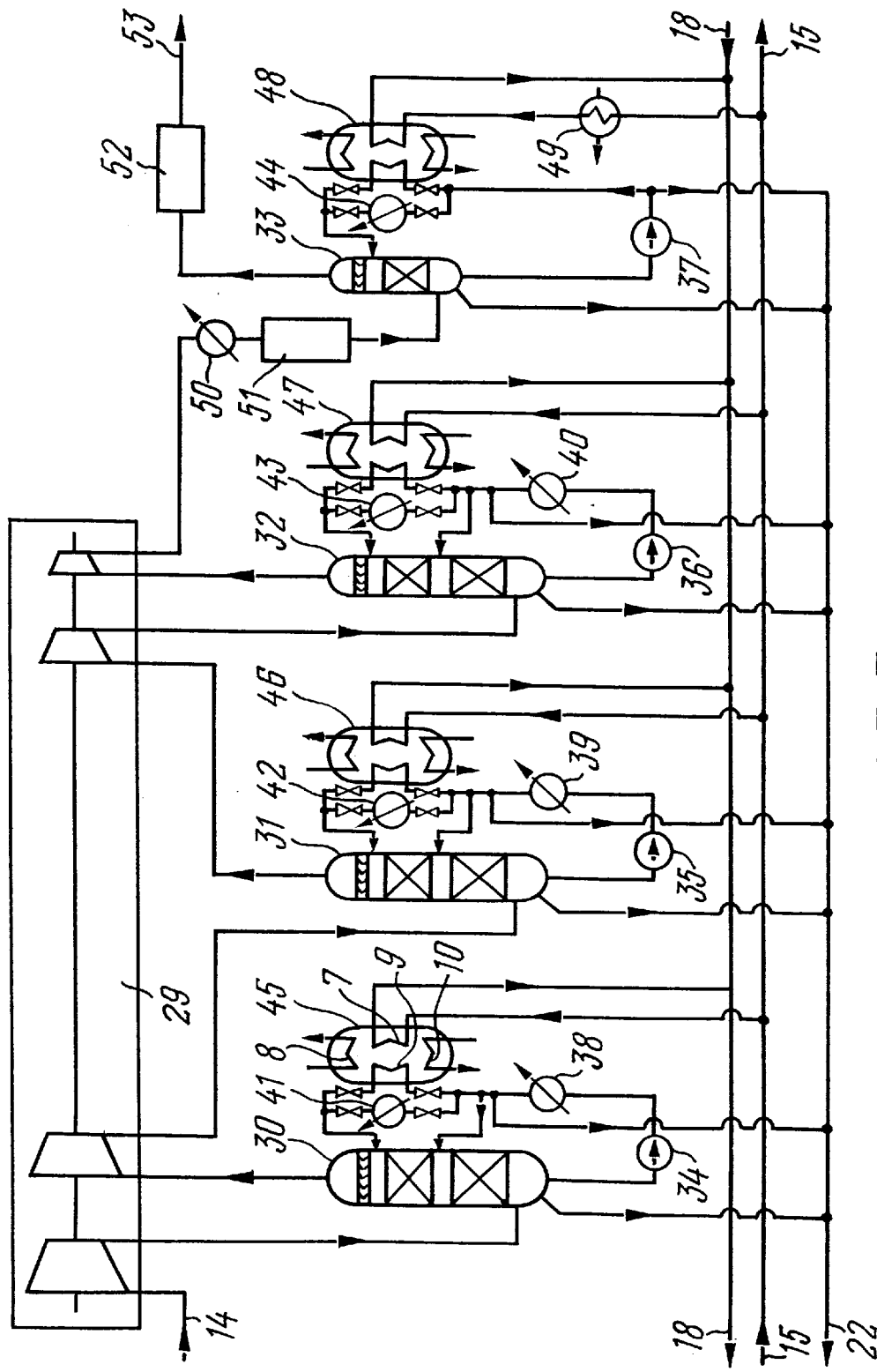
FIG. 3 is a schematic diagram of the unit for multistage compression of pyrolysis gas with intermediate and final cooling.

The diagram of the unit for multistage compression of pyrolysis gas with intermediate and final cooling (FIG. 3) comprises a four-stage compressor 29, scrubbers 30, 31, 32 and 33, recycling pumps 34, 35, 36 and 37 for operating liquid, aerial (spray) coolers 38, 39, and 40 for the operating liquid, additional aerial (spray) coolers 41, 42, 43 and 44 for the operating liquid, absorption lithium bromide refrigerating machines (ALRM) 45, 46, 47 and 48 with the generators 7, condensers 8, evaporators 9, and absorbers 10, a heater 49 for regenerated washing water, an aerial (spray) cooler 50 for pyrolysis gas, a unit 51 for alkaline washing pyrolysis gas, a unit 52 for drying pyrolysis gas, and a line 53 for feeding pyrolysis gas for low temperature cooling.

The scrubbers 30, 31 and 32 for the intermediate cooling of pyrolysis gas are made with two-stage washing, the scrubber 33 for final cooling of pyrolysis gas is made with one-stage washing.

The additional aerial (spray) coolers 41, 42, 43 and 44 are connected in parallel to the evaporators 9 of the respective ALRMs 45, 46, 47 and 48.

Figure 4:
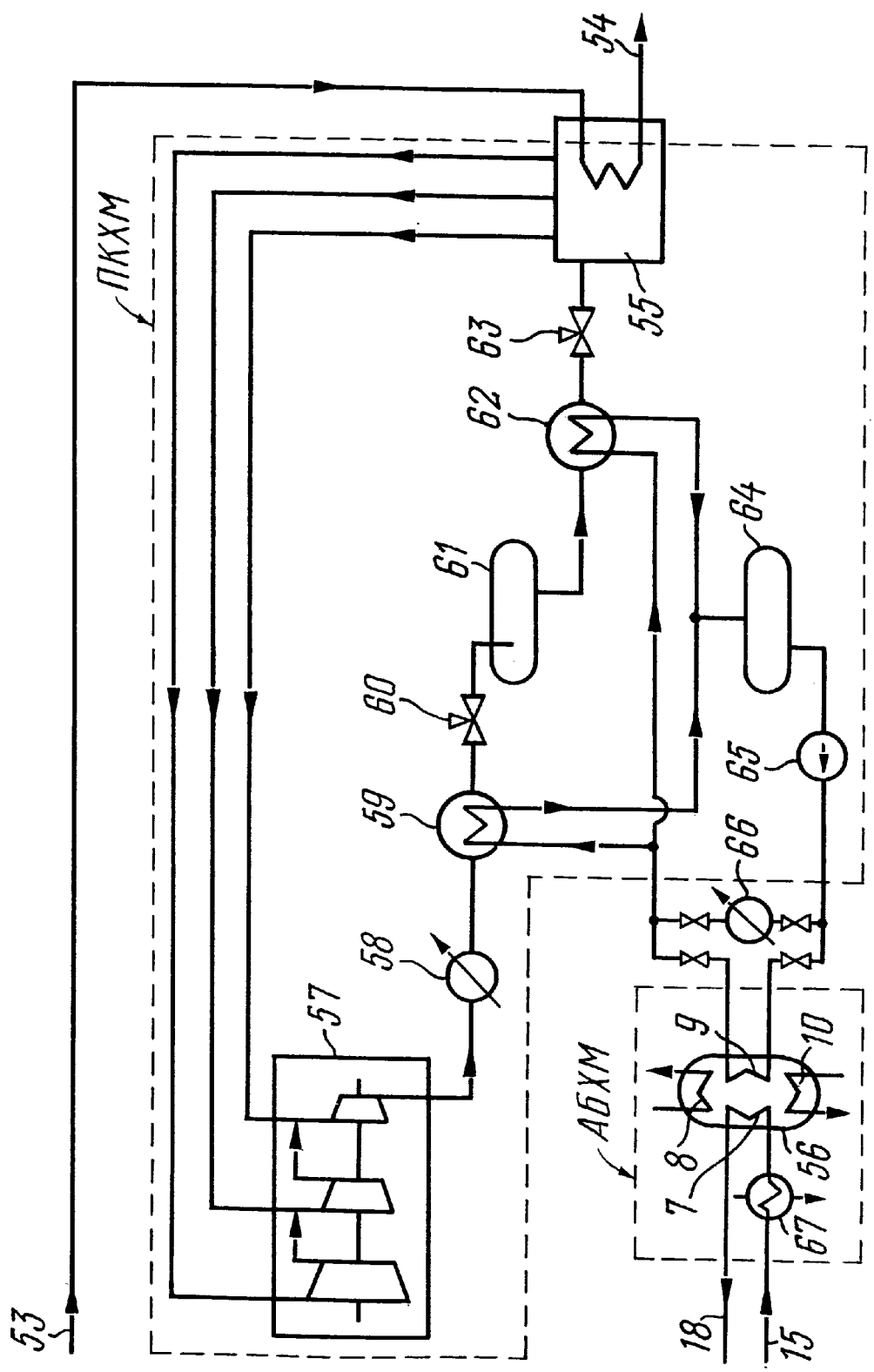
FIG. 4 is a schematic diagram of the vapour compression refrigerating machine with overcooling of a coolant by means of an absorption refrigerating machine.

The diagram of a vapour compression refrigerating machine (VCRM) for the low temperature cooling of pyrolysis gas (FIG. 4) comprises a line 54 for feeding cold pyrolysis gas for separation, a system 55 of intermediate vessels and VCRM evaporators, an absorption lithium bromide refrigerating machine (ALRM) 56 with generator 7, a condenser 8, an evaporator 9, and an absorber 10, a cooling compressor 57, an aerial (spray) cooling condenser 58, an overcooler 59 for the liquid coolant, a control valve 60, a receiver 61 for the liquid coolant, an additional overcooler 62 for the liquid coolant, a throttle valve 63, a receiver 64 for the ALRM coolant, a recycling pump 65 for the ALRM coolant, and an additional aerial (spray) cooler 66, connected in parallel to the evaporator 9 of the ALRM 56, an additional heater 67 for regenerated washing water installed prior to the ALRM generator 7.

This method for processing pyrolysis gas prior to gas separation is carried out in the following manner.

Pyrolysis gas of hydrocarbon stock, for example, ethane, after cooling in hardening-evaporation units of pyrolysis furnaces and in a primary fractionation column is fed at a temperature of about 100° C. and a pressure of 1.5 atm through the input gas (pyrolysis gas) line 13 into the three-stage water washing column 1, in which hot pyrolysis gas is cooled by washing water, with a reduction of the temperature at the stages to 63° C., 45° C., and 18–20° C., respectively. The process of cooling is accompanied by partial condensation of heavy hydrocarbons and water vapours, which are removed into the washing water settler 2. In the settler, the washing water is purified from the pyrolysis condensate (heavy hydrocarbons) and by means of the pump 3 for regenerated washing water is fed in parallel for cooling to the aerial cooler 4 of washing water, the heater of the flows 5, and the generator 7 of ALRM 6, as well as by means of the line 15 for regenerated washing water into the unit of the multistage compression of pyrolysis gas (FIG. 3) into the generators 7 of ALRMs 45, 46, 47 and 48. Water from these generators is returned along the line 18 for cooling washing water into the unit for cooling pyrolysis gas (FIGS. 1 and 2) and then along the lines 19, 20 and 21 for recycling water to the first, second and third (last) of the water washing stages with respective temperatures of 60° C., 42° C. and 15–17° C. A part of the recycling water is further cooled in the aerial (spray) cooler 12 which works as a sprayer in the hot season of the year.

During the processing of gases of pyrolysis of heavy hydrocarbon fractions, for example, gases of pyrolysis of petrol, waste recycling water from the third water washing stage (FIG. 2) is fed into the washing water settler 24 of the additional loop 23. From the settler heavy hydrocarbons are fed along the line 27 for hydrocarbon condensate by means of the pump 28 at a pressure of 4.5 atm into pyrolysis gas, which is directed for cooling between the stages of the compressor 29. Water from this settler is fed along the line 26 for regenerated washing water by means of the pump 25 for cooling down to 15° C. into the evaporator 9 of ALRM 6 and then into the three-stage water washing column 1.

Figure 2:
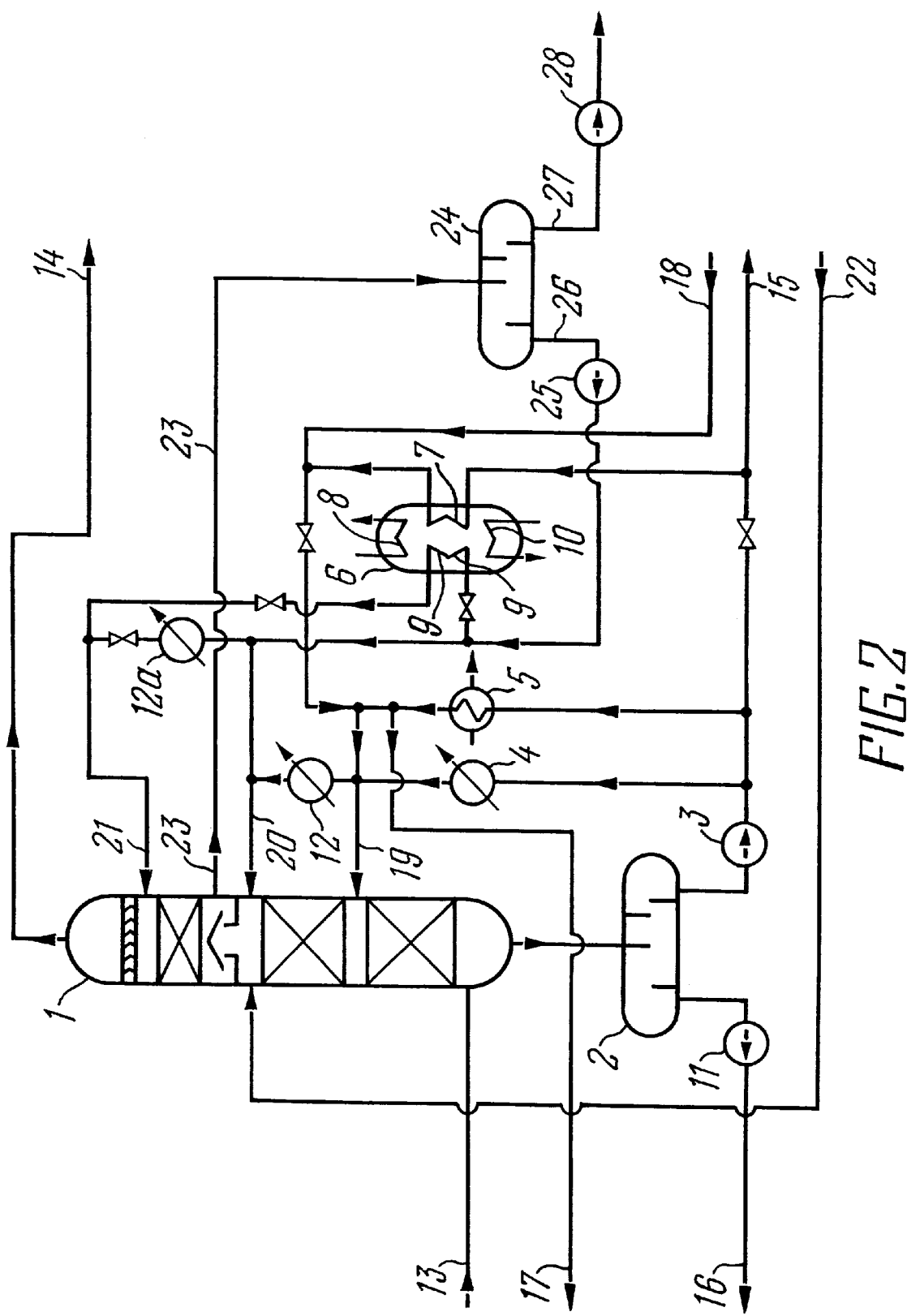
FIG. 2 is a schematic diagram of the unit for cooling gases of pyrolysis of heavy hydrocarbon fractions, prior to compression.

Pyrolysis gas from the column 1 is fed along the line 14 for washed pyrolysis gas for compression into the four-stage compressor 29 with intermediate cooling between stages and final cooling. Compressed in the first stage of compressor 29, pyrolysis gas at a temperature of 85–90° C. is fed into the interstage cooling unit, comprising the scrubber 30, the recycling pump 34 for the operating liquid (water), the aerial (spray) coolers 38, and the ALRM 45. Pyrolysis gas is fed into the scrubber 30 where it is cooled by means of double stage contact heat exchange with the operating liquid (or water) with a decrease of the temperature of the pyrolysis gas at the end of the stages to 45° C. and 18–20° C., respectively. Heavy hydrocarbons and water vapours condense from the pyrolysis gas cooled in the scrubber 30 and then mix with the operating liquid, while the pyrolysis gas is fed to the second stage of the compressor 29. Waste operating liquid is regenerated by removing the hydrocarbon condensate therefrom into the line 22. The regenerated operating liquid is fed by the recycling pump 34 to the aerial (spray) cooler 38 and then to the evaporator 9 of the ALRM 45, which is actuated by supplying heat to the generator 7 from the washing water from the water washing column 1 along the line 15 for regenerated washing water 15. After the aerial (spray) cooler 38, the water condensate is removed from the operating liquid and fed into the line 22 for hydrocarbon condensate, which is connected to the water washing column 1 (FIGS. 1 and 2).

A part of the regenerated operating liquid after the aerial (spray) cooler 38 at a temperature of 42° C. is recycled into the scrubber 30 and fed to the first stage for cooling pyrolysis gas. The remaining part of the operating liquid after the evaporator 9 at a temperature of 15–17° C. is fed into the scrubber 30 at the second stage for cooling pyrolysis gas. Interstage cooling is accomplished in the same way after the remaining stages of the compressor (after the second and the third stages).

After the last (the fourth) stage of the compressor 29, compressed pyrolysis gas is fed to the aerial (spray) cooler 50, in which its temperature decreases to 42° C., and then to the unit of alkaline washing 51, where pyrolysis gas is purified from carbon dioxide and sulfur compounds. The pyrolysis gas is fed from the unit of alkaline washing 51 into the scrubber 33, in which it cools down to a temperature of 18° C. by means of contact heat exchange with the operating liquid. Then the pyrolysis gas enters into the drying unit 52 and by means of the line 53 is fed for low temperature cooling down to minus 30° C.

In order to increase the temperature potential of the heat that is used for the actuation of the ALRM 48, the heater 49 in installed in the line that feeds water into the generator 7 of this ALRM.

The method for producing low temperature cold in a vapour compression refrigerating machine during the processing of pyrolysis gas prior to gas separation is carried out in the following manner.

The vapours of the VCRM coolant formed during the low temperature cooling of pyrolysis gas therewith in the system of intermediate vessels and evaporators 55 (FIG. 4), and the vapours of the intermediate pressure coolant, formed at the stages of its partial throttling and removed by means of said vessels, are fed into corresponding stages of the refrigerator compressor 57. The coolant, compressed in the refrigerator compressor 57, is condensed in the condenser 58 of water of aerial (spray) cooling, then partially overcools in the overcooler 59 of the liquid coolant by means of heat exchange with the cooling carrier of the ALRM 56 from the evaporator 9. After the control valve 60, the liquid coolant enters the receiver 61 and then the additional overcooler 62, the liquid coolant is fed into the throttle valve 63 of the first partial throttling stage. The vapour and liquid coolant mixture that is formed during this throttling is fed for separation into the first intermediate vessel (not shown in FIG. 4) of the system of intermediate vessels and evaporators 55 of the VCRM. Vapours of the coolant which are separated in this vessel are fed, as was indicated above, to the corresponding stage of the refrigerator compressor 57 (the third, having the highest intermediate pressure). The liquid coolant from the first intermediate vessel is directed to the second partial throttling and separation stage (not shown in the diagram) of system 55 with the removal of separated vapours of the coolant into the second stage of the refrigerator compressor 57 and supply of the remaining liquid coolant for final throttling and then into the evaporator (not shown in the diagram) of system 55 for said low temperature cooling of pyrolysis gas.

The cooling carrier of ALRM, heated in the overcoolers 59 and 62, is collected in the receiver 64. From this receiver it is fed by means of the recycling pump 65 into the evaporator 9 of the ALRM 56 for cooling and then to these overcoolers. Industrially produced absorption lithium bromide refrigerating machines are used as the ALRM. To make the functioning of the ALRM possible, its generator 7 is heated by waste washing water from the column 1 for water washing pyrolysis gas (flow 15), and its condenser 8 and absorber 10 are cooled by the external medium. Wherein, washing water leaving the generator 7 and cooled therein is recycled along line 18 into the water washing column 1.

INDUSTRIAL APPLICABILITY

This invention may be used during the processing of oil gas and for the production of low temperature cold. It may also be used in the oil-refining and gas-processing industry and the refrigeration engineering field.

We claim:

1. A method for processing pyrolysis gas prior to gas separation, comprising:

cooling hot pyrolysis gas with partial condensation of heavy hydrocarbons and water vapours by means of direct contact heat exchange between the pyrolysis gas and circulation water in a water washing column and supplying the cooled pyrolysis gas for compression;

removing condensate of the heavy hydrocarbons and water vapours with waste hot circulation water from the water washing column and separating the hydrocarbon condensate from that water;

cooling the hot circulation water with an external medium in heat exchangers and suppling the cooled circulation water into the water washing column for cooling pyrolysis gas;

compressing the pyrolysis gas in a multistage compressor with cooling of pyrolysis gases between compression stages and after the compressor with removal of the hydrocarbons and water vapours condensed thereby from the pyrolysis gas;

wherein the improvement comprises providing further cooling of the pyrolysis gas by direct contact heat exchange between the pyrolysis gas and the circulation water or operating liquid, the circulation water or operating liquid being further cooled by means of absorption refrigeration machines using the hot circulation water after the cooling of the pyrolysis gas in the water washing column as the heat carrier.

2. A method as in claim 1 wherein the further cooling of the pyrolysis gas is provided:

either prior to the compressor by means of direct contact heat exchange between the gas and the circulation water;

and/or between the compressor by means of direct contact heat exchange between the gas and the operating liquid.

3. A method as in claim 2, wherein during the further cooling of the pyrolysis gas, provision is made for:

circulating the cooling circulation water in a separate loop;

supplying the hydrogen condensate obtained from the pyrolysis gas during its further cooling into the pyrolysis gas directed for cooling between the compression stages.

4. A method as in claim 1, wherein the temperature of the pyrolysis gas during its further cooling is lowered to values limited by the hydrate formation temperature.

5. A method as in claim 1, wherein the circulation water an/or operating liquid prior to the further cooling by means of the absorption refrigerating machines is cooled by an external medium in heat exchangers, wherein water and/or atmospheric air preliminarily cooled in a hot season of the year by evaporation of water dispersed therein is used as the external medium.

6. A method as in claim 2, wherein water is used as the operating liquid.

7. A method for producing low temperature cold in a vapour compression refrigerating machine during the processing of pyrolysis gas prior to gas separation, comprising:

compressing vapours of a coolant in a refrigerant compressor;

condensing vapours of the coolant and overcooling liquid coolant with cooling water;

throttling the liquid coolant into an intermediate vessel with the removal of the formed vapours of the coolant vapours formed threreby into the refrigerant compressor;

final throttling, evaporating the liquid coolant to obtain low temperature cold for cooling pyrolysis gas, and supplying the formed coolant vapours into the refrigerant compressor;

wherein the improvement comprises providing overcooling of the liquid coolant with a vapour compression refrigerant machine by means of an absorption refrigerating machine using hot circulation water after cooling the pyrolysis gas in a water washing column as the heat carrier.

8. A as in claim 7, wherein heat that is evolved in the process of condensation of the coolant is removed to atmospheric air that is preliminary cooled in a hot season of the year by evaporation of water dispersed therein.

9. A process according to claim 2, wherein the temperature of gases of pyrolysis under their cooling is decreased to the minimum values, restricted by the temperature of the formation of hydrates.

10. A process according to claim 3, wherein as an external medium atmospheric air, preliminary cooled in hot seasons of the year by the evaporation of sprayed water in it, is used.

11. A process according to claim 3, wherein as an external medium water is used.

12. A process according to claim 5, wherein as an operating liquid water is used.

* * * * *

UNITED STATES PATENT AND TRADEMARK OFFICE
CERTIFICATE OF CORRECTION

PATENT NO. : 5,946,941
DATED : Sep. 7, 1999
INVENTOR(S) : Sinelnikov

It is certified that error appears in the above-identified patent and that said Letters Patent is hereby corrected as shown below:

Claim 2, line 6, replace "and/or between the compressor" with --and/or between the compression stages of the compressor and/or after the compressor--

Signed and Sealed this

Ninth Day of May, 2000

Attest:

Q. TODD DICKINSON

*Attesting Officer*     *Director of Patents and Trademarks*